Patented Dec. 1, 1942

2,303,964

UNITED STATES PATENT OFFICE 2,303,964

POROUS CERAMIC INSULATING MATERIAL

Alfred Ungewiss, Berlin-Grunewald, Germany; vested in the Alien Property Custodian No Drawing. Application April 5, 1938, Serial No. 200,269. In Germany April 20, 1937

8 Claims. (Cl. 106—46)

This invention relates to a porous ceramic insulating material showing a low dielectric loss and to a process of producing same.

After having been fired the material according to the invention can be subjected to methods of treatment usually applied in wood and metal working, i. e., turning, drilling, milling or sawing, with corresponding dimensional accuracy. This subsequent workability of the material permits a variety of new uses for which ceramic materials were not suited hitherto.

Until now, ceramic insulating materials poor in electric loss comprised merely vitrified substances of various compositions, as magnesium silicates of the steatite group, which contain titanium dioxide as chief constituent, and others.

All these substances, however, lack workability and for this reason cannot be made after firing into pieces of accurate measurements. This fact prevented their use for numerous purposes, as molded pieces meeting substantial requirements as to accuracy of measure cannot be produced by ceramic firing as such due to the action of drying and firing shrinkage and distortion during baking.

The insulating substances according to the invention consist of at least 50% technically pure acid or basic oxides or mixtures of such oxides in original or molten form, or, alternatively, of mixtures of these products that are either preliminarily treated to form oxides or molten, particularly silicates and spinels rich in base, as forsterite or magnesia spinel, and, besides, of the usual constituents of ceramic masses, as plasticizers and inorganic binding substances.

When making up the batch of these constituents, it should be noted that eutectic mixtures of the constituents, which would melt at the usual industrial baking temperatures of pyrometric cone 10 to 15, should be avoided. Firing is therefore effected at these customary temperatures without any appreciable sintering together of the constituents, so that a porous body of fine-grained structure is obtained which possesses the properties mentioned above.

As basic oxides those of the alkaline-earth and earth metals are suited; as acid oxide, silicic acid in various forms may be used.

Masses which contain as a component mixtures of the two-component system MgO—SiO$_2$, which have been preliminarily baked at high temperature or molten in the electric arc, possess special strength. Mixtures of the mixed crystal series magnesia-magnesia spinel, which are perfectly miscible in any proportion, can also serve as components of the novel mass in a highly advantageous manner if they are in preliminarily baked or electrically molten condition.

To increase strength, if the batch contains an excess of free silicic acid, it is advisable to add a basic component and, if it contains free basic oxide, an acid component.

Such basic oxides, for instance MgO or CaO, are preferably used in the form of their carbonates, as magnesite, marble, calc-spar or dolomite, since these substances at Seger cone 10 to 15 give off their carbonic acid, whereby loosening of the structure and a further improvement of workability are attained.

The relatively slight plasticity of such mixtures resulting from this composition frequently requires, however, additional plasticization which should absolutely avoid the addition of constituents rich in alkali to retain the property of low dielectric loss.

Suitable plasticizers are substances free from alkali and containing clay substance, as kaolin and clay, particularly calcium bentonite.

If naturally occurring magnesium silicates like soapstone are used as mass constituents, their introduction will simultaneously effect additional plasticization of the mass in a highly advantageous manner. Plasticizers that can be used in each instance are the pure hydroxides of the oxide components employed or mixtures thereof. The known organic plasticizers, on occasion, may also be used to improve the plasticity of the masses, particularly if degrees of plasticity are to be attained which permit deformation of the masses on a press for wire cutting and by turning or by moist or dry pressing.

An essential condition of the success of the new process is to avoid the presence of eutectics that will melt at the baking temperatures employed. Particularly in masses consisting of MgO—Al$_2$O$_3$—SiO$_2$ should the known low-melting mixtures be absolutely avoided or, if at all, should be present only in slight quantities.

When plasticizers containing clay substance are used, the formation of greater amounts than 10% of the eutectic clay substance—magnesium silicate must also be avoided.

By suitable composition of the mass or the addition of organic substances free from alkali and burning without residue the dielectric constant of the substances may be varied at will between 2.5 and 7.10$^{-6}$.

Working of the substances prepared in the manner described and distinguished by very slight dielectric loss may be effected at speeds 20 to 50 times greater than those applying to the working of dense bodies.

This quality is apparently a result of the peculiar texture of these in themselves porous substances which may be conceived as systems of a very large number of extremely fine grains that are firmly united only in places of their surface by crystalline intergrowth. During working the tool severs the junctions, so that the substance is worked off in the form of dust. The tools used should be made of good tool steel, preferably special hard steels.

The mechanical stress properties of the substances according to the invention are of course not so favorable as those of densely sintered substances, but by the strength increasing measures described and the systematic production of a comparatively slight degree of porosity adapted to the working strength desired the flexibility of the substances can nevertheless be brought up to that of a medium grade porcelain.

The following examples state a few compositions of masses according to the invention and their dielectric data:

Example 1

| | Parts by weight |
|---|---|
| Alumina | 60 |
| Molten silicic acid | 10 |
| Magnesium hydroxide (pasty) | 10 |
| Aluminium hydroxide (pasty) | 10 |
| Clay substance | 5 |
| Calcium-bentonite | 5 |

This mass after dry pressing at a baking temperature of Seger cone 13 disclosed a water absorbing capacity of about 20%; the dielectric loss amounted to $tg\gamma=15.10^{-4}(\lambda=300)$, dielectric constant $\epsilon=3.3$.

Example 2

| | Parts by weight |
|---|---|
| Molten silicic acid | 40 |
| Silicic hydrate in gel form | 30 |
| Magnesite | 20 |
| Calcium-bentonite | 10 |

This mass after dry pressing at a firing temperature of Seger cone 13 disclosed a water absorbing capacity of 35%; the dielectric constant is $\epsilon=2.6$; the dielectric loss is
$$tg\gamma=16.10^{-4}(=\lambda 300);$$
dielectric constant $\epsilon=3.3$.

Example 3

| | Parts by weight |
|---|---|
| Molten quartz | 40 |
| Forsterite, electrically molten | 20 |
| Magnesite | 5 |
| Silicic hydrate in gel form | 25 |
| Calcium-bentonite | 10 |

This mass after dry pressing and baking at Seger cone 13 disclosed a water absorbing capacity of about 30%; its dielectric constant is $\epsilon=2.8$; dielectric loss $tg\gamma=15.10^{-4}(\lambda=300)$; the bending strength amounts to an even one-third of the usual porcelain value.

Example 4

| | Parts by weight |
|---|---|
| Magnesia spinel, electrically molten, of the composition $2MgO—1Al_2O_3$ | 10 |
| Forsterite, electrically molten | 10 |
| Magnesite | 27 |
| Plastic clay | 7 |
| Calcium-bentonite | 6 |
| Organic plasticizer | 3 |

This mass after dry pressing at Seger cone 13 disclosed a water absorbing capacity of about 25%. Its dielectric loss is $tg\gamma=1.10^{-4}(\lambda=300)$; dielectric constant $\epsilon=3.5$.

Example 5

| | Parts by weight |
|---|---|
| Forsterite, electrically molten | 50 |
| Silicic acid, electrically molten | 15 |
| Magnesite | 22 |
| Plastic clay | 11 |
| Calcium-bentonite | 2 |

This mass after baking at Seger cone 13 disclosed a water absorbing capacity of approximately 10%; its dielectric loss is
$$tg\gamma=3—4.10^{-4}(\lambda=300);$$
dielectric constant $\epsilon=5$. The bending strength of this substance is equal to that of a pressed porcelain. It will be noted that in the above formulae in each case there is at least one of the ingredients of the three groups mentioned in proportions not greater than of the order of 10%. In Example 1, the chief ingredient is alumina while the silica and magnesia are both low. In Examples 2 and 3 the silica is high, while the alumina is quite low. In Example 4, the magnesia and alumina are more nearly equal, but the silica is present in relatively small amounts incidental to other compounds, while in Example 4 the silica and magnesia are in relatively even proportions while the alumina is introduced only as an incidental ingredient of the plasticizer. Each of these examples results in avoiding any material amounts of low melting compounds.

The substances according to the invention can be used in many ways and employed to particular advantage in the manufacture of pattern parts.

In case of difficultly moldable articles they may be made of several parts which can be conveniently molded separately and are subsequently glazed together. This method is an essential feature of the invention as is also the step in the manufacture of insulating bodies of dense ceramic material which require particularly accurate working after firing at certain points to attach to these points portions of the workable substance according to the invention by glazing. Glazing together is effected at much lower temperatures than the firing temperature and does not in any way interfere with the accuracy of shape of the articles. In connection with glazing further working is possible also.

The invention is not restricted to the forms of application and the compositions of masses described, but may be varied in many ways without departing from its fundamental idea.

I claim:

1. A ceramic insulating body for use in high frequency engineering, said body consisting of grains sintered together only at their contacting points and constituting a finely porous structure in which the pores constitute at least 10% of the bulk, said body being workable by the usual tools at the usual speeds in turning, fraising and boring metal, having a dielectric loss of $tg\delta$ of less than $20.10^{-4}=300$ m. and a dielectric constant of between 2.5 and 6, and having the composition resulting from firing together ceramic materials, at least 50% of said materials being of the group consisting of magnesia-alumina spinel and forsterite, approximately 13% of said material being alkali-free plastic clay, and the remainder of said materials being prefused oxide of alkaline earth metal.

2. A ceramic insulating body for use in high frequency engineering, said body consisting of grains sintered together only at their contacting points and constituting a finely porous structure in which the pores constitute at least 10% of the bulk, said body being workable by the usual tools at the usual speeds in turning, fraising and boring metal, having a dielectric loss of $tg\ \delta$ of less than $20.10^{-4}=300$ m. and a dielectric constant of between 2.5 and 6, and having the composition resulting from firing together ceramic materials, at least 50% of said materials being of the group consisting of magnesia-alumina spinel and forsterite, approximately 13% of said materials being alkali-free plastic clay and the remainder of said materials being prefused material of the group consisting of the oxides of the alkaline earth metals and silicon.

3. A ceramic body for use in high frequency engineering, said body consisting of the fired combination of materials substantially as follows: 50 parts by weight magnesia spinel, electrically molten, of the composition $2MgO—1Al_2O_3$, 10 parts by weight forsterite, electrically molten, 27 parts by weight magnesite, 7 parts by weight plastic clay, 6 parts by weight calcium-bentonite, 3 parts by weight organic plasticizer, and the batch being fired at temperatures between cone 10 and 15 for a time that results in a finely porous structure in which the total volume of the pores constitutes at least 10% of the total bulk.

4. A ceramic body for use in high frequency engineering, said body consisting of the fired combination of materials substantially as follows: 50 parts by weight forsterite, electrically molten, 15 parts by weight silicic acid, electrically molten, 22 parts by weight magnesite, 11 parts by weight plastic clay, 2 parts by weight calcium-bentonite, and the batch being fired at temperatures between cone 10 and 15 for a time that results in a finely porous structure in which the total volume of the pores constitutes at least 10% of the total bulk.

5. A method of making a ceramic insulating body which consists in forming a batch, at least 50% of the batch being of the group consisting of magnesia-alumina spinel and forsterite, approximately 13% of the batch being alkali-free plastic clay, the remainder of the batch being of ceramic material consisting of prefused oxide of alkaline earth metal, and as much organic plasticizer as necessary to make the mass workable, forming the material into shape, the batch containing no materials which melt at or below cone 10, firing the body at a temperature between cone 10 and 15 to a point just sufficient to cause the grains of the material to unite at their points of surface contact by crystalline growth and not to melt any portion of the body, the grains being compacted and fired so that at least 10% of the bulk of the body consists of pores.

6. A method of making a ceramic insulating body which consists in forming a batch, at least 50% of the batch being of the group consisting of magnesia-alumina spinel and forsterite, approximately 13% of the batch being alkali-free plastic clay, the remainder of the batch being of ceramic material consisting of prefused material of the group consisting of oxides of alkaline earth metals and silica, and as much organic plasticizer as necessary to make the mass workable, forming the material into shape, the batch containing no materials which melt at or below cone 10, firing the body at a temperature between cone 10 and 15 at a point just sufficient to cause the grains of the material to unite at their points of surface contact by crystalline growth and not to melt any portion of the body, the grains being compacted and fired so that at least 10% of the bulk of the body consists of pores.

7. A method of making a ceramic insulating body which consists in forming a batch having approximately the following compositions: 50 parts by weight magnesia spinel, electrically molten, of the composition $2MgO—1Al_2O_3$, 10 parts by weight forsterite, electrically molten, 27 parts by weight magnesite, 7 parts by weight plastic clay, 6 parts by weight calcium-bentonite, 3 parts by weight organic plasticizer, forming the material into shape, the batch containing no materials which melt at or below cone 10, firing the body at a temperature between cone 10 and 15 and to a point just sufficient to cause the grains of the material to unite at their points of surface contact by crystalline growth and not to melt any portion of the body, the grains being compacted and fired so that at least 10% of the bulk of the body consists of pores.

8. A method of making a ceramic insulating body which consists in forming a batch having approximately the following compositions: 50 parts by weight forsterite, electrically molten, 15 parts by weight silicic acid, electrically molten, 22 parts by weight magnesite, 11 parts by weight plastic clay, 2 parts by weight calcium-bentonite, forming the material into shape, the batch containing no materials which melt at or below cone 10, firing the body at a temperature between cone 10 and 15 at a point just sufficient to cause the grains of the material to unite at their points of surface contact by crystalline growth and not to melt any portion of the body, the grains being compacted and fired so that at least 10% of the bulk of the body consists of pores.

ALFRED UNGEWISS.